(12) United States Patent
Tamilarasan et al.

(10) Patent No.: US 12,360,693 B2
(45) Date of Patent: Jul. 15, 2025

(54) PROCESSING PAGES MARKED FOR DELETION

(71) Applicant: Dell Products L.P., Round Rock, TX (US)

(72) Inventors: Ashok Tamilarasan, Shrewsbury, MA (US); Pavan Kumar Vutukuri, Chelmsford, MA (US); Vamsi K. Vankamamidi, Hopkinton, MA (US); Philippe Armangau, Acton, MA (US)

(73) Assignee: Dell Products L.P., Round Rock, TX (US)

( * ) Notice: Subject to any disclaimer, the term of this patent is extended or adjusted under 35 U.S.C. 154(b) by 227 days.

(21) Appl. No.: 17/568,180

(22) Filed: Jan. 4, 2022

(65) Prior Publication Data

US 2023/0214143 A1    Jul. 6, 2023

(51) Int. Cl.
*G06F 16/17*    (2019.01)
*G06F 3/06*    (2006.01)

(52) U.S. Cl.
CPC .......... *G06F 3/0635* (2013.01); *G06F 3/0604* (2013.01); *G06F 3/0652* (2013.01); *G06F 3/0659* (2013.01); *G06F 3/067* (2013.01); *G06F 16/1727* (2019.01)

(58) Field of Classification Search
CPC .................................................. G06F 16/1727
USPC ......................................................... 707/813
See application file for complete search history.

(56) References Cited

U.S. PATENT DOCUMENTS

| | | | |
|---|---|---|---|
| 10,140,307 B1 * | 11/2018 | Armangau .......... | G06F 16/1727 |
| 10,146,466 B1 | 12/2018 | Puhov et al. | |
| 11,068,455 B2 | 7/2021 | Shabi et al. | |
| 2020/0341959 A1 * | 10/2020 | Shabi .................. | G06F 16/2246 |
| 2020/0349149 A1 | 11/2020 | Wang et al. | |
| 2022/0035785 A1 | 2/2022 | Vankamamidi et al. | |

* cited by examiner

*Primary Examiner* — Baoquoc N To
(74) *Attorney, Agent, or Firm* — BainwoodHuang

(57) ABSTRACT

A technique for managing a mapping structure in a data storage system includes identifying levels in the mapping structure of pages to be removed and estimating the workload required for removing the pages based at least in part on the identified levels. The technique further includes initiating processing of the pages based at least in part on the estimated workload.

20 Claims, 4 Drawing Sheets

PROCESSING PAGES MARKED FOR DELETION

BACKGROUND

Data storage systems are arrangements of hardware and software in which storage processors are coupled to arrays of nonvolatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the nonvolatile storage devices.

One common function of storage systems is to associate logical addresses of host-accessible data objects with physical addresses where corresponding physical data elements are located. Storage systems may use mapping structures such as trees in performing this function. For example, a mapping structure may include multiple nodes arranged in levels. A node at each level, except a bottom level, may fan out to multiple nodes in a level below, with nodes at the bottom level pointing to data, or to other structures that point to data. Nodes at the same level may be grouped into pages in memory and may be persisted as blocks. To read or write data that backs a specified logical address, a storage processor may access a top-level node associated with the logical address and follow pointers down the structure to a bottom-level node that points to the data. Examples of host-accessible data objects may include files, LUNs (Logical UNits), virtual machine disks, and the like.

Sometimes, it can happen that pages of a mapping structure are no longer needed. For example, data may be deleted, snapshots may be merged, or other changes may occur that cause pages of the mapping structure to be removed. Removing pages from a mapping structure allows the pages and associated blocks to be freed, so that they may be available for other purposes. To avoid slowing down real-time activities of the storage system, removing a page from a mapping structure may involve placing a descriptor of that page in a collection bin for later processing. The storage processor may monitor the collection bin and periodically process its contents, e.g., by freeing the pages in the collection bin, as well as the associated blocks, once the number of pages in the collection bin exceeds a threshold.

SUMMARY

Unfortunately, the above-described approach to removing pages from a mapping structure can cause processing workloads to be unpredictable. We have recognized that pages sent to the collection bin may appear at any level of the mapping structure and that the amount of processing required when deleting pages strongly depends on the level of those pages in the structure. For example, deleting a bottom-level page takes much less processing than deleting a top-level page, as deleting the top-level page may require deleting all pointed-to pages at lower levels.

The consequences of unpredictable workloads can be severe. Storage systems have finite memory, so processing the collection bin cannot be deferred indefinitely. If a storage system greatly underestimates the amount of processing needed, it may wait too long to start addressing the collection bin and may have to slow down real-time activities in order to complete the work, such as by throttling I/O requests. But throttling I/O requests directly impacts performance felt by customers, as delayed I/O responses slow down customer applications. Overestimating the workload for processing the collection bin can also have detrimental effects, as it may result in resources being allocated to processing the collection bin when they could instead be used for more critical tasks. What is needed is a more accurate way of predicting the workload required to remove pages from a mapping structure.

To address this need at least in part, an improved technique for managing a mapping structure in a data storage system includes identifying levels in the mapping structure of pages to be removed and estimating the workload required for removing the pages based at least in part on the identified levels. The technique further includes initiating processing of the pages based at least in part on the estimated workload.

Advantageously, the improved technique estimates workloads for processing pages for removal more accurately than was possible using the prior approach. Computing resources are thus applied more intelligently, where those resources are actually needed. Unnecessary throttling of I/O requests can be avoided, thereby allowing customer applications to run at higher speeds.

Certain embodiments are directed to a method of managing a mapping structure in a data storage system. The method includes identifying levels within the mapping structure of pages to be removed from the mapping structure and generating, based at least in part on the identified levels, a workload estimate for processing the pages to be removed. The method further includes initiating processing of the pages for removal based at least in part on the workload estimate.

Other embodiments are directed to a computerized apparatus constructed and arranged to perform a method of managing a mapping structure, such as the method described above. Still other embodiments are directed to a computer program product. The computer program product stores instructions which, when executed on control circuitry of a computerized apparatus, cause the computerized apparatus to perform a method of managing a mapping structure, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for managing a mapping structure in a data storage system includes identifying levels in the mapping structure of pages to be removed and estimating the workload required for removing the pages based at least in part on the identified levels. The technique further includes initiating processing of the pages based at least in part on the estimated workload.

Figure 1:
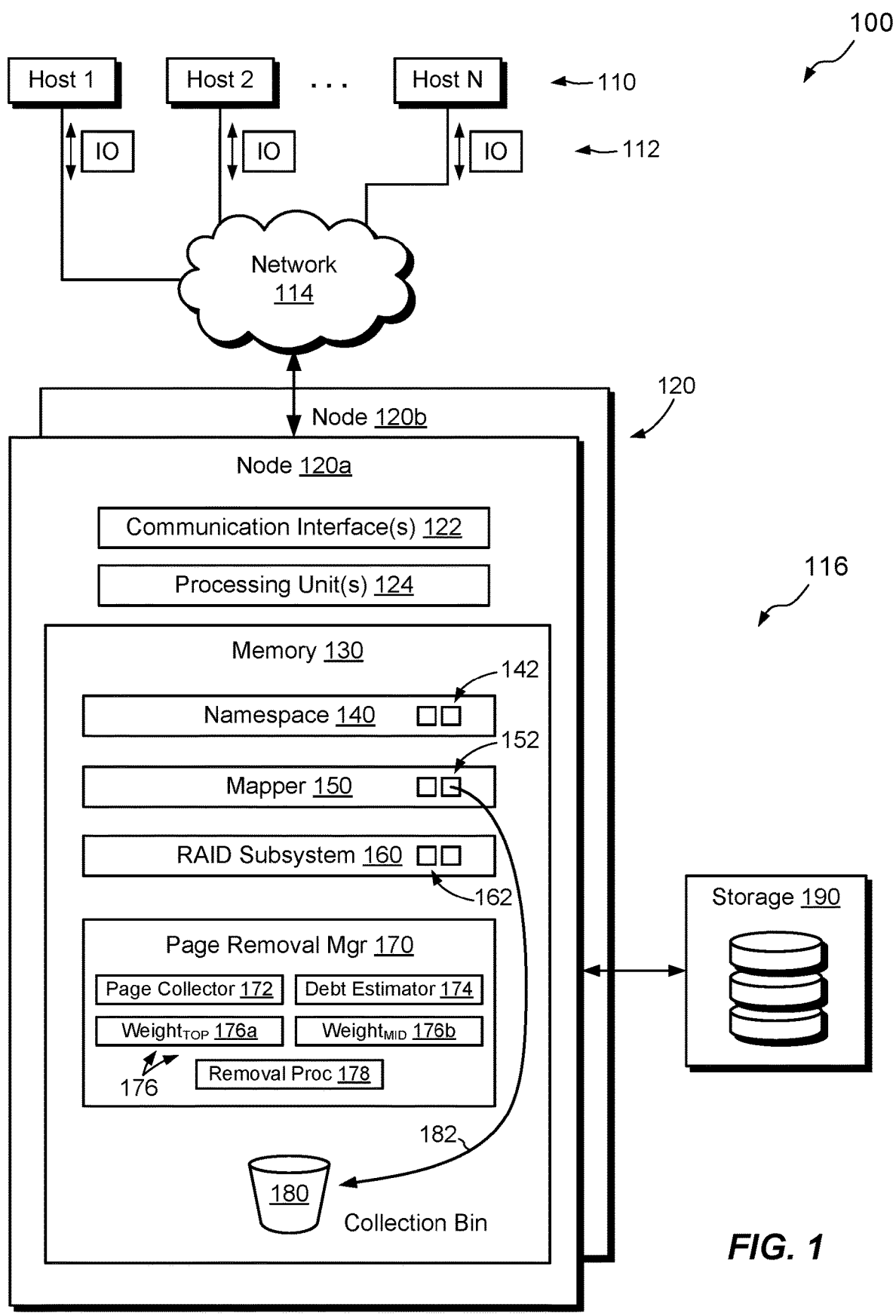
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes one or more storage processors 120, referred to herein as "nodes" (e.g., nodes 120a and 120b), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the nodes 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The nodes 120 may each be configured to receive I/O requests 112 according to block-based and/or file-based protocols and to respond to such I/O requests 112 by reading or writing the storage 190.

The depiction of node 120a is intended to be representative of nodes 120 generally. As shown, node 120a includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the node 120a. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a namespace 140, a mapping structure 150 (also referred to herein as a "mapper"), and a RAID (Redundant Array of Independent Disks) subsystem 160. The namespace 140 is configured to organize logical data, such as LUNs, file systems, virtual machine disks, snapshots, clones, and the like, which may include data objects accessible by hosts 110. In an example, the namespace 140 provides a large logical address space, such as 8 exabytes ($8*10^{18}$ bytes) in size. The namespace 140 may be denominated in blocks 142, which may be uniform in size (e.g., 4 kB, 8 kB, etc.). For example, the namespace 140 may present a 2-MB file using 512 4-kB blocks. Each of the blocks has a respective logical address within the namespace 140. Blocks 142 may be allocated from the namespace 140 on demand.

The mapper 150 is configured to map logical blocks 142 in the namespace 140 to respective physical blocks 162 in the RAID subsystem 160. Unlike logical blocks, which are arranged in order and linearly represent the contents of a data object one-to-one, physical addresses may be arranged out of order and need not be provided one-to-one. For example, the same physical block may be shared among multiple logical blocks (e.g., consequent to deduplication, snapshots, and the like).

The mapper 150 may include many pages 152, and the pages may be arranged in one or more tree structures having multiple levels. In a non-limiting example, the mapper 150 arranges pages 152 in four levels, referred to herein as roots, tops, mids, and leaves. Other examples may include different numbers of levels. To map a logical block 142 in the namespace 140 to a corresponding physical block 162 in the RAID subsystem 160, the mapper 150 establishes a path from the logical block to a root, from the root to a top, from the top to a mid, from the mid to a leaf, and from the leaf to the physical block. Although roots may be pre-allocated, pages 152 for tops, mids, and leaves may be allocated on demand, i.e., as needed for mapping logical data.

Although not shown, some embodiments may further include a block-virtualization layer between the mapper 150 and the RAID subsystem 160. The block-virtualization layer includes block virtualization structures that allow physical blocks 162 to be moved without having to update leaves in the mapper 150.

The RAID subsystem 160 is configured to organize physical blocks 162 in RAID groups or other disk arrays, such as mapped RAID. Such RAID groups or arrays provide storage redundancy an protect against data loss. Although the term "physical" is used herein to describe blocks 162 in the RAID subsystem 160, one should appreciate that the actual, physical media that store the data of blocks 162 are found in persistent storage 190. Thus, the term "physical" as used herein merely describes blocks as represented below the mapper 150.

Referring still to FIG. 1, node 120*a* further includes a page removal manager 170 and a collection bin 180. Page removal manager 170 is configured to remove pages 152 from the mapper 150 when the pages are no longer needed, thus freeing the pages for use elsewhere in the mapper 150 and/or by other system components. To this end, page removal manager 170 may include a page collector 172, a debt estimator 174, and a removal processor 178.

Page collector 172 is configured to receive indications of pages 152 to be removed from the mapper 150 and to place descriptors of those pages in the collection bin 180 for later processing. Removal of pages may be consequent to deletions of data, snap mergers, or other operations. In an example, pages to be removed may include tops, mids, and/or leaves. In accordance with improvements hereof, the page collector 172 marks pages added to the collection bin 180 with indications of their levels, e.g., whether each page is a top, mid, or leaf. Alternatively, the page collector 172 may indicate levels of pages in some other way, such as by sending pages to different regions of the collection bin 180 based on their level. Placing pages in the collection bin 180 allows processing of the pages for removal to be deferred. Deferring removal of pages in the collection bin 180 allows the node 120*a* to prioritize real-time activities, such as managing I/O requests 112, over page removal, which normally is not time-critical. Removal of pages can proceed in the background, preferably when the node 120*a* is less busy addressing real-time needs.

Debt estimator 174 is configured to estimate the workload that would result from processing the pages in the collection bin 180 for removal. In accordance with improvements hereof, debt estimator 174 bases its estimates of debt non only on the number of pages in the collection bin 180, but also on the levels of those pages in the mapper 150. Thus, debt estimator 174 takes into account the fact that removing a mid typically requires more processing resources than removing a leaf, and removing a top typically requires more processing resources than removing a mid. Debt estimator 174 may perform its functions in part by assigning weights 176 to pages at different levels of the mapper 150. For instance, one weight 176*a* ($\text{Weight}_{TOP}$) may be assigned for tops, and another weight 176*b* ($\text{Weight}_{MID}$) may be assigned for mids. In some examples, a separate weight may be assigned for leaves ($\text{Weight}_{LEAF}$), although the weight for leaves may be presumed to be "1" in some examples.

Removal processor 178 is configured to process the pages in the collection bin 180 for removal. Such processing may involve freeing pages 152 that are no longer needed and freeing any blocks that persist those pages. Additional metadata may be updated to reflect the changes. When processing tops and mids, removal processor 176 may operate recursively, e.g., by processing mids pointed-to by a designated top before processing that top, and by processing leafs pointed-to by a designated mid before processing that mid.

In example operation, the hosts 110 issue I/O requests 112 to the data storage system 116. The nodes 120 receive the I/O requests 112 at the communication interfaces 122 and initiate further processing. Such processing may include creating and storing data objects at the direction of hosts 110. As data objects are created and written, logical blocks 142 are allocated to the namespace 140 for accommodating new data. Also, pages 152 are allocated in the mapper 150 for constructing mapping trees for mapping the new logical blocks 142 to corresponding physical blocks 162.

As operation proceeds, data may be deleted or merged. For example, a data object or a range of data within a data object may be deleted from the namespace 140. Such deletion renders pages 152 that map the now-deleted data unused. Data may also be merged. For example, a pair of snapshots (point-in-time versions) of a data object may be merged into a single object, thus rendering certain pages 152 unused.

When operations occur that cause pages 152 of the mapper 150 to become unused, software constructs that manage those operations may provide the page collector 172 with the identities and levels of the unused pages. For example, the page collector 172 is informed of the locations of the unused pages (e.g., cache locations and/or block locations) and whether those pages are tops, mids, or leaves. For each unused page, page collector 172 adds a descriptor of that page to the collection bin 180 (arrow 182). The descriptor preferably identifies the page by location or address and indicates its level. In this manner, any number of unused pages may be added to the collection bin 180.

On some basis, such as periodically, debt estimator 174 computes an estimate of the debt (i.e., predicted workload) associated with processing the pages identified in the collection bin 180. In an example, the workload estimate is based at least in part on the number of pages identified in the collection bin 180 at each level and the associated weights 176 attributed to those levels.

Removal processor 178 monitors the predicted workload computed by the debt estimator 174 and initiates processing of the pages identified by the collection bin based at least in part on the estimated workload. For example, removal processor 178 may activate in response to the predicted workload exceeding some threshold. The threshold may be static or it may be dynamic. For example, the threshold may be varied based on system busyness, free memory resources, and/or other factors. Once initiated, the removal processor 178 processes pages identified by the collection bin 180 for removal, e.g., by freeing pages and associated blocks and making any other needed changes. The removal processor 178 may operate on pages recursively, such that leaves are freed before mids and mids are freed before leaves. One should appreciate that the removal processor 178 need not process the pages identified by the collection bin 180 all at once. Rather, the removal processor 178 may operate repeatedly over time, starting and stopping as system resources permit.

Figure 2:
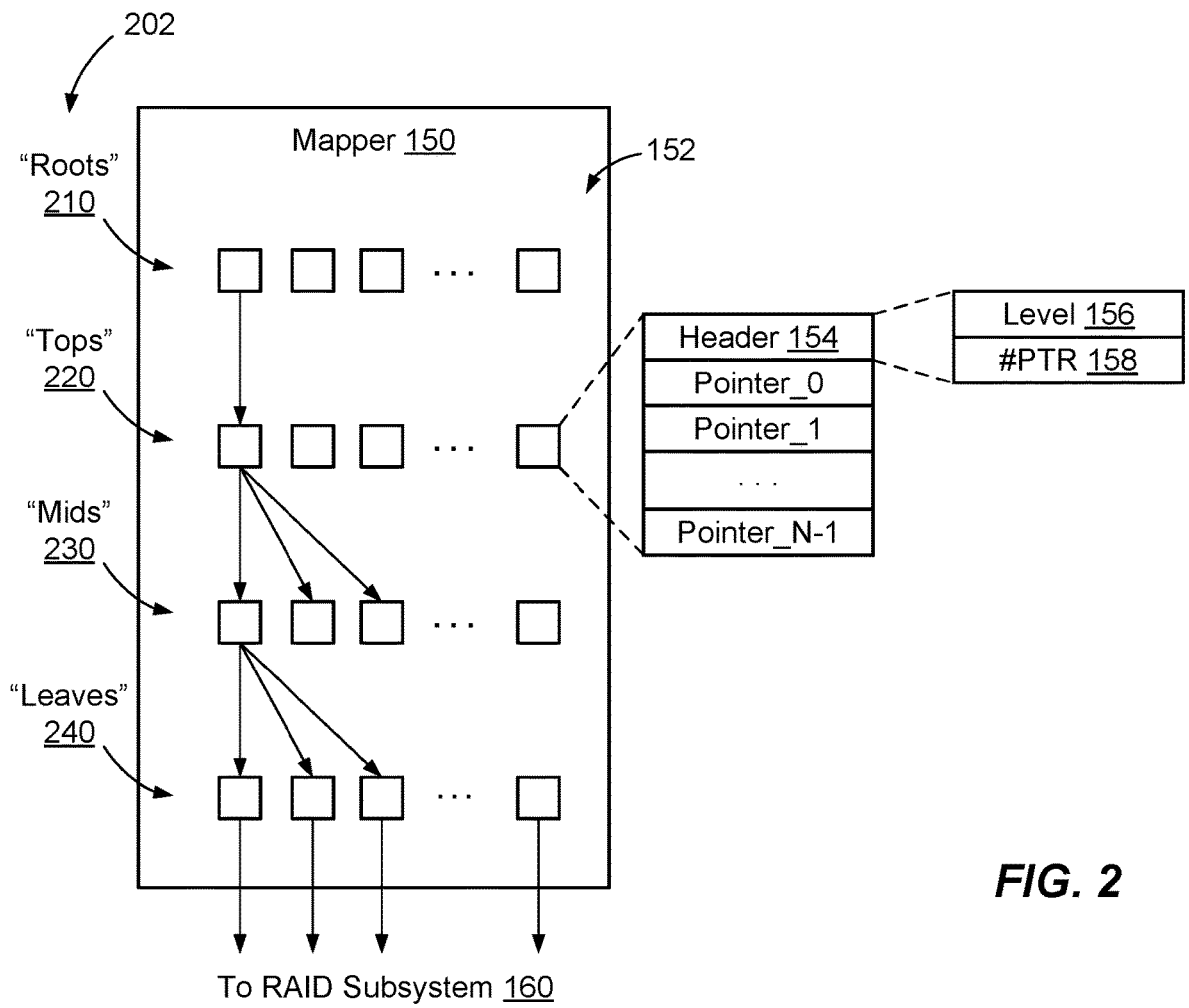
FIG. 2 is a block diagram of an example mapping structure of FIG. 1.

FIG. 2 shows example features of the mapper 150 in additional detail. Here, pages 152 of the mapper 150 are arranged based on levels 202, into roots 210, tops 220, mids 230, and leaves 240. The pages 152 include respective arrays of pointers, and the pointers at each level 202 can point only to pages at the level immediately below. Thus, roots can point only to tops, tops can point only to mids, and mids can point only to leaves. Leaves can point only to data (e.g., physical blocks 162 in the RAID subsystem 160 or block virtualization structures). Assuming that each page 152 includes 512 pointers (N=512), the amount of data that can be mapped by pages 152 increases by a factor of 512 as one ascends the mapper 150 by each level from leaves to mids to tops to roots. For example, assuming 4-kB data blocks, a single leaf 240 can point to as many as 512 data blocks, or 512*4 kB=2 MB of data. A single mid can point to as many as 512 leaves, or 512*2 MB=1 GB of data. A single top can point to as many as 512 mids, or 512 GB of data, and a single root can point to as many as 512 tops, or 256 TB of data. One should appreciate that 512 is merely one suitable value for the maximum number N of pointers per page 152. Other common values include 256, 1024, and 2048, for example. Also, pages at different levels 202 of the mapper 150 may support different numbers of pointers. Using the same number for all levels is merely an example.

It is apparent that the workload involved in removing a page 152 from the mapper 150 depends strongly on the level 202 of that page. For example, removing a mid may require up to N=512+1 times the effort of removing a leaf (the mid plus all of the pointed-to leaves). Likewise, removing a top may require up to N=512+1 times the effort of removing a mid. These workloads are the bases for worst-case estimates, as the effort involved may be estimated more accurately based on actual numbers of pointers used at each level. For example, if a top points to only one mid, and that mid points to only one leaf, then the workload required to remove the top may be only 3 times that of removing the leaf alone. This result compares to a worst-case prediction for a top of approximately $N^2$, or 262,144 times the workload of removing the leaf alone.

As shown to the right of FIG. 2, each of the pages 152 may include a header 154 and an array of N pointers (Pointer_0 through Pointer_N−1; e.g., N=512). The header 154 may include a level indicator 156 to specify the level 202 of the respective page (e.g., whether that page is a root, top, mid, or leaf) and the number 158 of pointers (#PTR) contained in the respective page. As will be described more fully below, providing both the level indicator 156 and the number of pointers for pages 152 enables more accurate estimates of workload to be computed for processing the collection bin 170.

In one example implementation, roots 210 are pre-allocated and cannot be removed from the mapper 150. For example, roots 210 may be dedicated to respective ranges of logical addresses supported by the namespace 140. In such cases, roots are not sent to the collection bin 180 as they can never be removed. In contrast, tops, mids, and leaves are dynamically allocated (and de-allocated) and may thus be sent to the collection bin 180 for removal when they are no longer needed.

Figure 3:
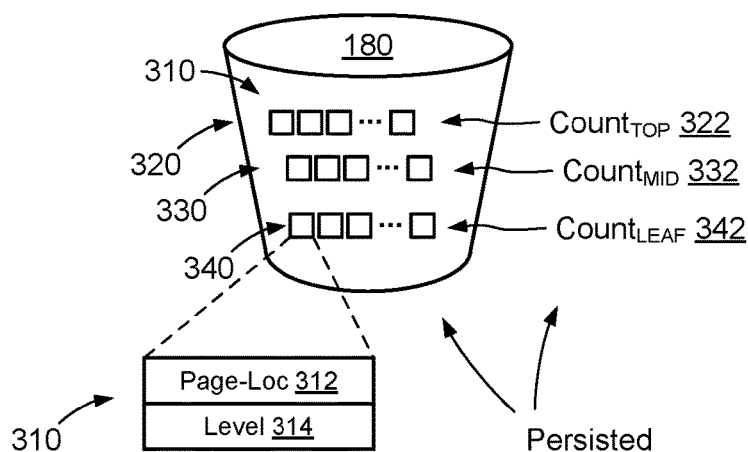
FIG. 3 is a block diagram of an example collection bin on FIG. 1.

FIG. 3 shows an example of the collection bin 180 in additional detail. As shown, the collection bin 180 includes descriptors 310 of pages 152 to be processed for removal. The descriptors 310 may include descriptors 320 for tops, descriptors 330 for mids, and descriptors 340 for leaves. In an example, the descriptors 310 each include a page-location indicator 312 and a level designator 314. The page-location indicator 312 specifies a location of the respective page 152 to be processed for removal, such as a location in cache and/or a location in persistent storage 190. The level designator 314 may specify whether the respective page is a top, mid, or leaf. In an example, the descriptors 310 are created by software constructs that handle data deletion or merger. The software constructs may identify the level 202 of a page based on the level indicator 156 of the associated page. Although they are shown as distinct groups, one should appreciate that page descriptors for different levels need not be grouped in any way and may indeed be intermixed.

Preferably, the collection bin 180 maintains separate counts of page descriptors 310 for tops, mids, and leaves. For example, $Count_{TOP}$ (322) specifies a count of top-page descriptors 320 in the collection bin 180, $Count_{MID}$ (332) specifies a count of mid-page descriptors 330, and $Count_{LEAF}$ (342) specifies a count of leaf-page descriptors 340. The counts 322, 332, and 342 may be incremented when new descriptors for pages at the respective levels are added and may be decremented when descriptors for pages at those levels are processed for removal.

Preferably, the node 120a persistently stores the contents of the collection bin 180. In this manner, the node 120a avoids creating stranded pages 152 in the event that the node 120a crashes before all the contents of the collection bin 180 can be processed. To promote faster recovery from crashes, node 120a may also persistently store the counts 322, 332, and 342 (although it is possible to regenerate the counts from restored descriptors 310).

Figure 4:
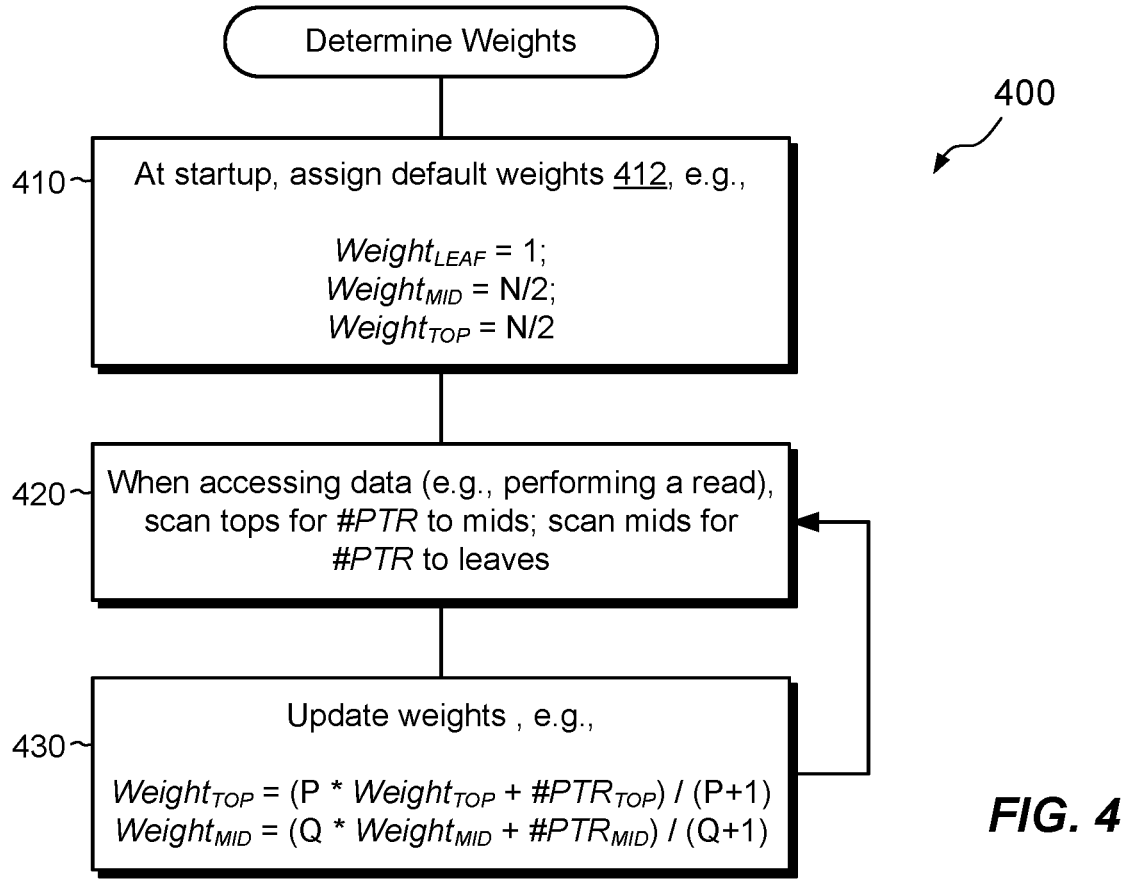
FIG. 4 is a flowchart showing an example method of determining weights used in estimating a workload for removing pages identified in the collection bin of FIG. 3.
Figure 5:
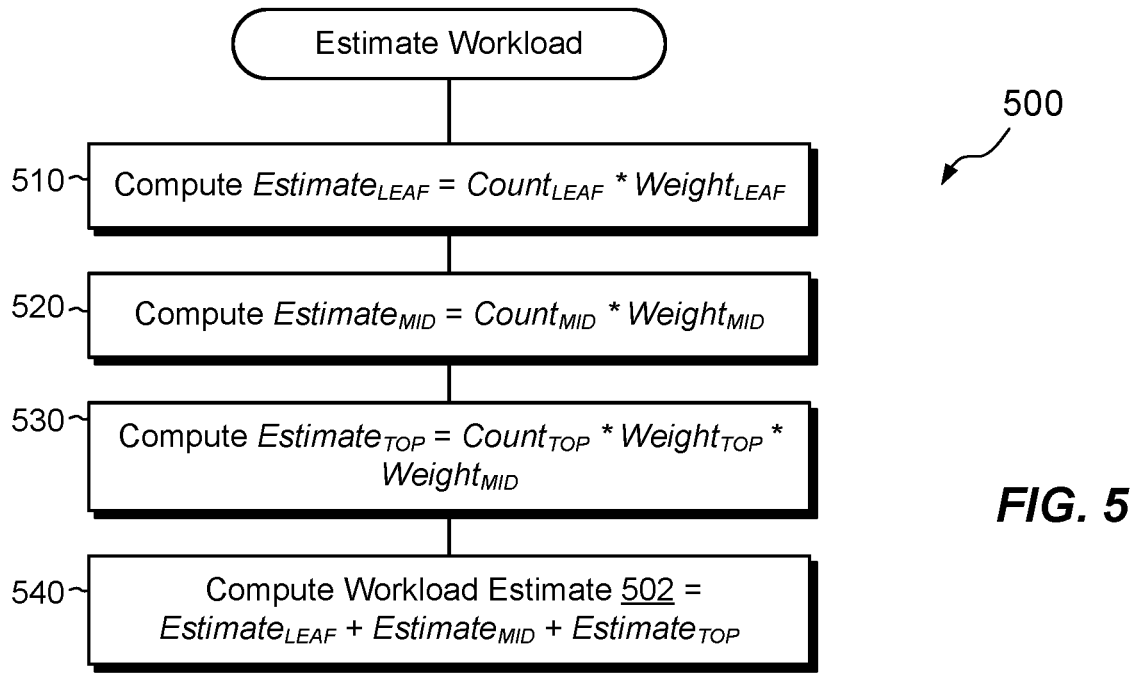
FIG. 5 is a flowchart showing an example method of estimating workload for removing pages identified in the collection bin using the weights determined in FIG. 4.
Figure 6:
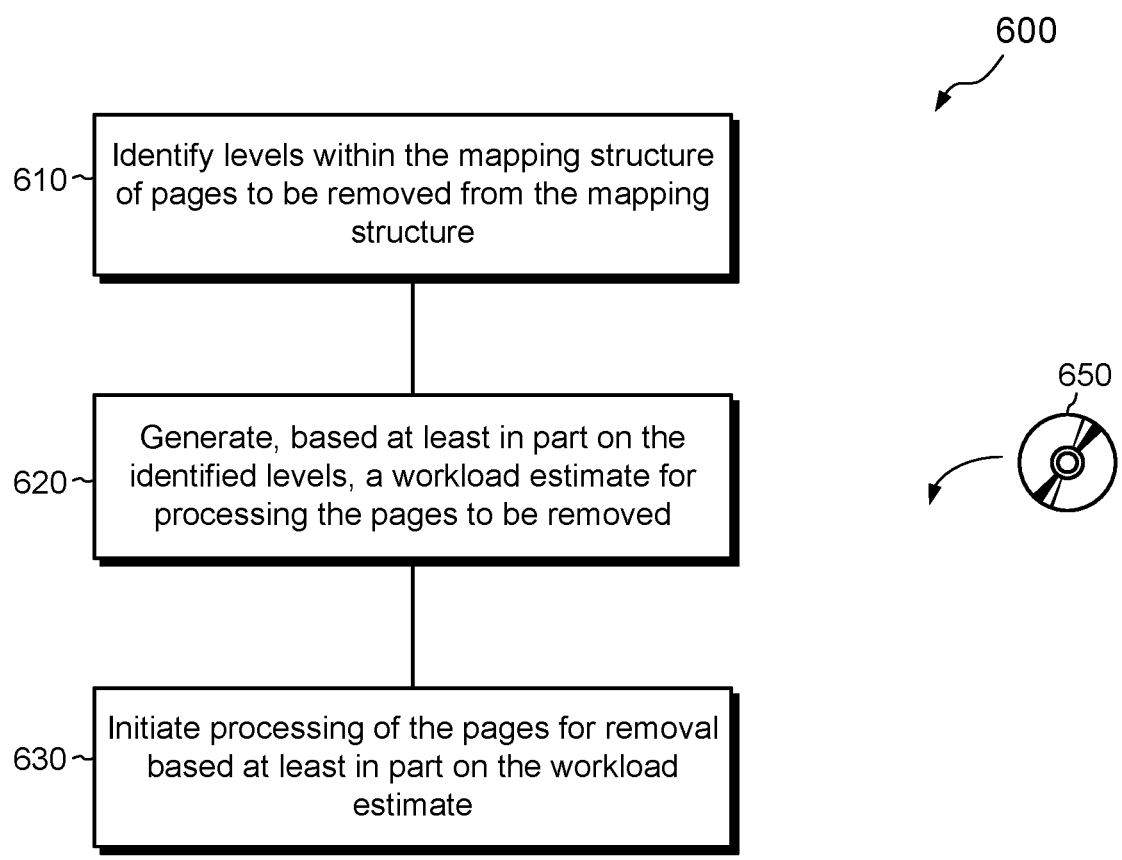
FIG. 6 is a flowchart showing an example method of managing a mapping structure in a data storage system, such as the one shown in FIG. 1.

FIGS. 4-6 show example methods 400, 500, and 600 that may be carried out in connection with the environment 100. The methods 400, 500, and 600 are typically performed, for example, by the software constructs described in connection with FIG. 1, which reside in the memory 130 of the node 120a and are run by the set of processing units 124. The various acts of methods 400, 500, and 600 may be ordered in any suitable way. Accordingly, embodiments may be constructed in which acts are performed in orders different from those illustrated, which may include performing some acts simultaneously.

FIG. 4 shows an example method 400 for determining weights 176 to be used in estimating the workload for processing the pages 152 identified in the collection bin 180 for removal. Method 400 may be carried out, for example, by the debt estimator 174 of the page removal manager 170 (FIG. 1).

At 410, method 400 begins by assigning default values 412 to weights 176. For example, $Weight_{LEAF}$ may be set to "1" and $Weight_{MID}$ and $Weight_{TOP}$ may each be set to N/2 (e.g., 256). In this manner, $Weight_{MID}$ and $Weight_{TOP}$ each reflect pages 152 that include half the maximum number of pointers. In an example, default values 412 may be used by node 120a upon startup, i.e., before the node 120a is aware of the actual degree to which pages 152 are populated with pointers.

At 420, method 400 accumulates information about numbers of pointers contained in tops and in mids based on accesses to data. For example, when performing a read of a requested data element, the read operation may scan the top (or tops) it encounters in the mapper 150 as it follows a path through the mapper 150 to the requested data. The read operation may note the number of mids pointed to by the top (or by each involved top). The read operation may then proceed to the pointed-to mids, scanning those mids to determine the number of leaves pointed to by each of the mids. Scanning of a page 152 may involve counting the number of pointers actually found in that page 152. Preferably, however, scanning a page 152 simply involves reading the #PTR value 158 from the page's header 154 (FIG. 2).

At 430, the method 400 updates weights 176 based on the counts discovered at 420. For example, step 430 may update $Weight_{TOP}$ as follows:

$$Weight_{TOP} = (P*Weight_{TOP} + \#PTR_{TOP})/(P+1),$$

where $\#PTR_{TOP}$ is the number of pointers to mids pointed to by a traversed top and "P" is an integer that sets an adaptation rate for $Weight_{TOP}$. Larger values of P cause $Weight_{TOP}$ to change more slowly than smaller values of P. Likewise, step 430 may update $Weight_{MID}$ as follows:

$$Weight_{MID} = (Q*Weight_{MID} + \#PTR_{MID})/(Q+1),$$

where #PTR$_{MID}$ is the number of pointers to leaves pointed to by a traversed mid and "Q" is an integer that sets an adaptation rate for Weight$_{MID}$. P and Q may be set to any suitable values and in some examples may be varied over time.

Operation may return to 420 upon a next read, where additional pointers are scanned, and then proceed to 430 where weights 176 are updated again. Operation may progress this way indefinitely.

One can see from method 400 that weights 176 may evolve over time from default values 412 to adjusted values that more accurately represent numbers of pointers 152 in the pages of the mapper 150. Weights Weight$_{TOP}$ and Weight$_{MID}$ do not necessarily represent individual pointers 152. Rather, they represent average values that tend to be accurate when considered over many pages 152. Weight$_{TOP}$ and Weight$_{MID}$ can thus provide a good basis for calculating estimates of workload required to process the collection bin 180, as the collection bin 180 typically contains descriptors 310 for a large number of pages 152.

Although method 400 is described as collecting information about numbers of pointers based on read operations, other operations may be used in addition to reads or in place of reads. For example, writes may be used, as well as any operation that involves accessing pages 152 in the mapper 150. Also, Weight$_{TOP}$ and Weight$_{MID}$ may be computed using equations different from those shown. There are many ways of computing averages and of phasing out old data, with the one shown being merely an example provided for illustration. Further, weights 176 may be scaled in any suitable way, provided that the relative sizes of the weights remain substantially as described.

FIG. 5 shows an example method 500 for estimating workload for processing pages 152 identified in the collection bin 180 for removal. Method 500 may be carried out, for example, by the debt estimator 174 of the page removal manager 170 (FIG. 1).

At 510, method 500 computes a workload estimate for leaves, i.e., pages 152 identified by leaf descriptors 340 (FIG. 3). The workload estimate for leaves may be computed as follows:

$$\text{Estimate}_{LEAF} = \text{Count}_{LEAF} * \text{Weight}_{LEAF},$$

where Count$_{LEAF}$ is the count 342 of leaves and Weight$_{LEAF}$ is normally "1."

At 520, method 500 computes a workload estimate for mids, i.e., pages 152 identified by mid descriptors 330 (FIG. 3). The workload estimate for mids may be computed as follows:

$$\text{Estimate}_{MID} = \text{Count}_{MID} * \text{Weight}_{MID},$$

where Count$_{MID}$ is the count 332 of mids and Weight$_{MID}$ is the weight computed in method 400 (FIG. 4).

Likewise, at 530, method 500 computes a workload estimate for tops, i.e., pages 152 identified by top descriptors 320 (FIG. 3). The workload estimate for tops may be computed as follows:

$$\text{Estimate}_{TOP} = \text{Count}_{TOP} * \text{Weight}_{TOP} * \text{Weight}_{MID},$$

where Count$_{TOP}$ is the count 322 of tops and Weight$_{TOP}$ is the weight computed in method 400. It is noted that Estimate$_{TOP}$ depends upon both Weight$_{TOP}$ and Weight$_{MID}$, as each top is assumed to point to some number of mids, and each mid is assumed to point to some number of leaves.

At 540, an overall workload estimate 502 is computed as the sum of the individual workloads described above, i.e., $$\text{Workload Estimate} = \text{Estimate}_{LEAF} + \text{Estimate}_{MID} + \text{Estimate}_{TOP}.$$

The overall workload estimate 502 is thus computed as a weighted sum based on weights 176 applied to respective levels 202 and on counts of pages at the respective levels. One should appreciate that acts 510, 520, and 530 may be performed in any order, or simultaneously.

Method 500 may be repeated, e.g., periodically, as often as desired, such as every half-second, every second, every two seconds, etc. The page removal manager 170 may activate the removal processor 178 based on the workload estimate 502, e.g., based on a comparison between the workload estimate 502 and a threshold. For example, the page removal manager 170 may activate the removal processor 178 when the workload estimate 502 exceeds the threshold.

FIG. 6 shows an example method 600 of managing a mapping structure 150 in a data storage system 116 (FIG. 1) and provides a summary of some of the features described above.

At 610, the method 600 identifies levels 202 (e.g., tops, mids, and leaves) within the mapping structure 150 of pages 152 to be removed from the mapping structure 150. Such levels 202 may be identified when creating descriptors 310 in the collection bin 180 for pages to be removed.

At 620, the method 600 generates, based at least in part on the identified levels, a workload estimate 502 for processing the pages 152 to be removed. For example, a workload estimate 502 may be generated using the method 500 as described in connection with FIG. 5.

At 630, the method 600 further includes initiating processing of the pages for removal based at least in part on the workload estimate 502. For example, the removal procedure 178 may be activated based on a comparison of the workload estimate 502 to a threshold.

An improved technique has been described for managing a mapping structure 150 in a data storage system 116. The technique includes identifying levels 202 in the mapping structure of pages 152 to be removed and estimating the workload 502 required for removing the pages 152 based at least in part on the identified levels 202. The technique further includes initiating processing of the pages 152 based at least in part on the estimated workload 502.

Having described certain embodiments, numerous alternative embodiments or variations can be made. Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing a mapping structure in a data storage system, comprising:
   upon determining that pages used in the mapping structure are no longer needed and can be removed from the mapping structure, placing descriptors of the pages in a collection bin;
   identifying levels within the mapping structure of the pages in the collection bin to be removed from the mapping structure;
   generating, based at least in part on the identified levels, a workload estimate for processing the pages to be removed, said generating including responding to I/O requests for accessing data pointed to by particular pages of the mapping structure and determining, based on the accessing, numbers of mapping pages of the mapping structure pointed to by the particular pages, the workload estimate thereby being based at least in part on the numbers of mapping pages of the mapping structure pointed to by the particular pages; and
   initiating processing of the pages for removal based at least in part on the workload estimate, wherein processing of the pages for removal includes freeing the pages for use elsewhere in the data storage system.

2. The method of claim 1, wherein generating the workload estimate includes:
   assigning weights to the pages based at least in part on the levels of the pages in the mapping structure; and
   computing a weighted sum based at least in part on the assigned weights.

3. The method of claim 2, wherein computing the weighted sum is further based at least in part on counts of pages to be removed from respective levels of the mapping structure.

4. The method of claim 2, wherein assigning weights includes assigning a first weight to pages at a first level of the mapping structure, and wherein the method further comprises adjusting the first weight to reflect counts of pages at a second level of the mapping structure pointed to by encountered pages at the first level, the second level being one level lower than the first level in the mapping structure.

5. The method of claim 4, wherein the encountered pages are encountered in response to read requests, and wherein the method further comprises generating the counts of pages at the second level in response to the read requests.

6. The method of claim 5, wherein generating the counts of pages at the second level includes scanning the encountered pages to count numbers of pointers in the encountered pages that point to pages at the second level.

7. The method of claim 4, wherein assigning weights includes assigning a second weight to pages at the second level of the mapping structure, and wherein the method further comprises adjusting the second weight to reflect counts of pages at a third level of the mapping structure pointed to by encountered pages at the second level, the third level being one level lower than the second level in the mapping structure.

8. The method of claim 7, wherein the encountered pages at the second level are encountered in response to read requests directed to data pointed to by the encountered pages at the second level, and wherein the method further comprises generating the counts of pages at the third level in response to the read requests.

9. The method of claim 2, wherein assigning the weights includes assigning default values for the weights upon startup of the data storage system.

10. The method of claim 9, wherein the pages to be removed each contain a maximum of N pointers, and wherein the default values for the weights are based on an average of N/2 pointers being used in the pages to be removed.

11. A computerized apparatus, comprising control circuitry that includes a set of processing units coupled to memory, the control circuitry constructed and arranged to:
    upon a determination that pages used in the mapping structure are no longer needed and can be removed from the mapping structure, place descriptors of the pages in a collection bin;
    identify levels within a mapping structure of the pages in the collection to be removed from the mapping structure;
    generate, based at least in part on the identified levels, a workload estimate for processing the pages to be removed, the control circuitry constructed and arranged to generate being further constructed and arranged to respond to I/O requests for accessing data pointed to by particular pages of the mapping structure and to determine, based on the access, numbers of mapping pages of the mapping structure pointed to by the particular pages, the workload estimate thereby being based at least in part on the numbers of mapping pages of the mapping structure pointed to by the particular pages; and
    initiate processing of the pages for removal based at least in part on the workload estimate, wherein the control circuitry constructed and arranged to process the pages for removal is further constructed and arranged to free the pages for use elsewhere in the computerized apparatus.

12. The computerized apparatus of claim 11, wherein the control circuitry constructed and arranged to generate the workload estimate is further constructed and arranged to:

assign weights to the pages based at least in part on the levels of the pages in the mapping structure; and compute a weighted sum based at least in part on the assigned weights.

13. A computer program product including a set of non-transitory, computer-readable media having instructions which, when executed by control circuitry of a computerized apparatus, cause the computerized apparatus to perform a method of managing a mapping structure, the method comprising:

upon determining that pages used in the mapping structure are no longer needed and can be removed from the mapping structure, placing descriptors of the pages in a collection bin;

identifying levels within the mapping structure of the pages in the collection bin to be removed from the mapping structure;

generating, based at least in part on the identified levels, a workload estimate for processing the pages to be removed, said generating including responding to I/O requests for accessing data pointed to by particular pages of the mapping structure and determining, based on the accessing, numbers of mapping pages of the mapping structure pointed to by the particular pages, the workload estimate thereby being based at least in part on the numbers of mapping pages of the mapping structure pointed to by the particular pages; and initiating processing of the pages for removal based at least in part on the workload estimate, wherein processing of the pages for removal includes freeing the pages for use elsewhere in the data storage system.

14. The computer program product of claim 13, wherein generating the workload estimate includes:

assigning weights to the pages based at least in part on the levels of the pages in the mapping structure; and computing a weighted sum based at least in part on the assigned weights.

15. The computer program product of claim 14, wherein assigning weights includes assigning a first weight to pages at a first level of the mapping structure, and wherein the method further comprises adjusting the first weight to reflect counts of pages at a second level of the mapping structure pointed to by encountered pages at the first level, the second level being one level lower than the first level in the mapping structure.

16. The computer program product of claim 15, wherein the encountered pages are encountered in response to read requests directed to data pointed to by the encountered pages, and wherein the method further comprises generating the counts of pages at the second level in response to the read requests.

17. The computer program product of claim 16, wherein generating the counts of pages at the second level includes scanning the encountered pages to count numbers of pointers in the encountered pages that point to pages at the second level.

18. The computer program product of claim 15, wherein assigning weights includes assigning a second weight to pages at the second level of the mapping structure, and wherein the method further comprises adjusting the second weight to reflect counts of pages at a third level of the mapping structure pointed to by encountered pages at the second level, the third level being one level lower than the second level in the mapping structure.

19. The method of claim 18, wherein the encountered pages at the second level are encountered in response to read requests directed to data pointed to by the encountered pages at the second level, and wherein the method further comprises generating the counts of pages at the third level in response to the read requests.

20. The method of claim 14, wherein assigning the weights includes assigning default values for the weights upon startup of the data storage system.

* * * * *